United States Patent [19]

Raffetto et al.

[11] 3,913,142

[45] Oct. 14, 1975

[54] HEAD INTERLACING TECHNIQUE

[75] Inventors: Michael J. Raffetto, Palos Verdes Peninsula; Ted Otto, Huntington Beach; Willard John Opocensky, Los Angeles, all of Calif.

[73] Assignee: Xerox Corporation, Stamford, Conn.

[22] Filed: Mar. 11, 1974

[21] Appl. No.: 449,880

[52] U.S. Cl. .................................. 360/109; 360/121
[51] Int. Cl. ........................... G11b 5/56; G11b 5/27
[58] Field of Search ....... 360/104, 98, 103, 77, 109, 360/121

[56] References Cited

UNITED STATES PATENTS

| | | | |
|---|---|---|---|
| 3,140,362 | 6/1964 | Cheney et al. | 360/103 |
| 3,187,317 | 6/1965 | Smith, Jr. | 360/77 |
| 3,245,063 | 5/1966 | Cheney et al. | 360/103 |
| 3,422,412 | 1/1969 | Linsley | 360/103 |

*Primary Examiner*—Bernard Konick
*Assistant Examiner*—David K. Moore
*Attorney, Agent, or Firm*—James J. Ralabate; Franklyn C. Weiss; Robert E. Cunha

[57] ABSTRACT

A method and apparatus for interlacing heads on a head-per-track disk file system are disclosed. Support members, containing a plurality of precision dowel pins for locating head bars thereon, are precisely located in relation to the disk center with an alignment tool developed for that purpose. These support members are bolted in place. Interchangeable head bars, each containing a plurality of recording heads, are then mounted onto the support members, located with the aid of the dowel pins and bolted in place. In this manner, recording heads on head bars may be replaced and properly interlaced without the need for any further adjustments.

8 Claims, 15 Drawing Figures

HEAD INTERLACING TECHNIQUE

BACKGROUND OF THE INVENTION

The present invention relates to a method for interlacing multiple read/write heads for use in a head-per-track disk file system.

In a typical disk file system the width of the recording head is slightly larger than the width of a track recorded on the disk. For instance, in the disclosed embodiment a track of data on the disk surface is ten thousandths of an inch wide. In order to allow adequate spacing between tracks, center-to-center track spacing of between fifteen and twenty thousandths is maintained across the entire disk radius. The recording head width is 14.5 thousandths. Thus, it can be seen that in a system containing a read/write head for each track some method of staggering, or interlacing, heads must be used.

In a typical prior art disk file system a plurality of read/write heads are assembled on a shoe or head bar. Each head is precisely mounted on the head bar to assure equal spacing between heads. Next these head bars are mounted over the disk and are adjusted so that the heads on all head bars are properly interlaced.

The assembly of such apparatus is difficult and time consuming, frequently results in head bars that cannot be interchanged, and frequently, can only be done at the factory. An example of the prior art is found in U.S. Pat. No. 3,657,711.

SUMMARY OF THE INVENTION

In accordance with the present invention, nine Recording Heads are assembled onto a Head Bar, and four Head Bars are mounted on a Head Mounting Arm. These assembly operations are performed at the factory in precision fixtures and result in 36 Recording Heads equally spaced along each Head Mounting Arm.

Next, two Ring Arm Supports, each containing two locator Precision Dowel Pins and two rotational stop Precision Dowel Pins on each of its upper and lower surfaces, are installed and located so that the distance of each locator pin from the disk center point differs from the next by one-fourth the distance between Recording Heads on a Head Mounting Arm. Thus, when each Head Mounting Arm is mounted on each corresponding locator pin, all Recording Heads on four Head Mounting Arms will be properly interlaced.

After the Head Mounting Arms are fitted on the corresponding locator pins, they are rotated until a shoulder on each arm contacts a second set of Precision Dowel Pins at which point, all Recording Heads on each arm will be lined up along a disk radius line.

The Recording Heads will now be properly located with respect to the disk, and are permanently bolted in place on the Ring Arm Support.

By using this apparatus and procedure, Head Mounting Arms may be easily interchanged or replaced with spares since no adjustments are required, each Head Mounting Arm is simply fitted onto a locator pin, rotated against a stop and bolted in place.

Through the use of the apparatus and method disclosed herein, the replacement of Head Bar Assemblies may be done in the field, so that returning the disk drive to the factory for replacement of Recording Heads is not necessary. Of course, work of this kind must be performed in a "clean room" environment.

It therefore is an object of this invention to provide a head-per-track disk drive system wherein interchangeable Head Bar Assemblies may be replaced using a method that does not require any head alignment adjustments to be made on the disk unit.

DETAILED DESCRIPTION OF THE INVENTION

Figure 1:
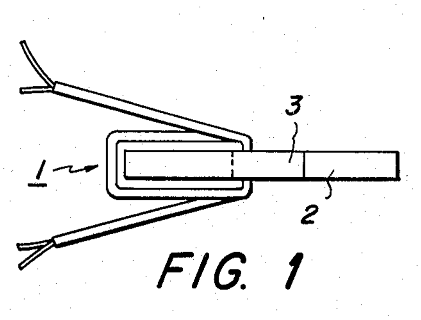
FIG. 1 is a bottom view of a Recording Head.
Figure 2:
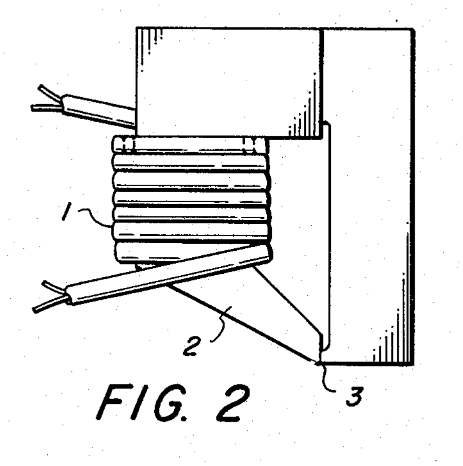
FIG. 2 is a side view of a Recording Head.

FIGS. 1 and 2 are bottom and side views of an individual Recording Head. The Winding 1 consists of about 14 turns wraped around a Core 2 of magnetic material. The Recording Head Gap 3 is shown in both figures.

Figure 6:
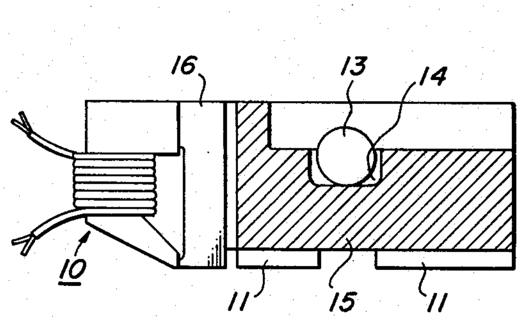
FIG. 6 is a side view of a Head Bar.
Figure 5:
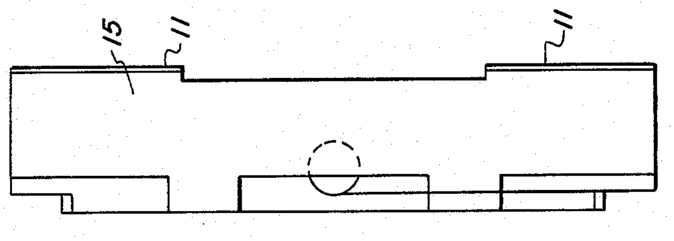
FIG. 5 is a front view of a Head Bar.

In FIGS. 3 through 6, nine Recording Heads 10 are mounted on each Head Bar 15. The direction of flight of the Head Bar in FIG. 6 is from left to right such that the Pads 11 pass over a unit of the disk surface before the Recording Head 10. One of the nine Recording Heads is a spare so that there are, in this embodiment, eight functional Recording Heads per Head Bar. The Recording Head Cores 16 are fitted into Solts 12 and cemented there with an anaerobic adhesive. A Sapphire Ball 13 is fixed with a high stability Epoxy adhesive within an Indentation 14 and is used as a precision mounting stud in later assembly steps.

Figure 4:
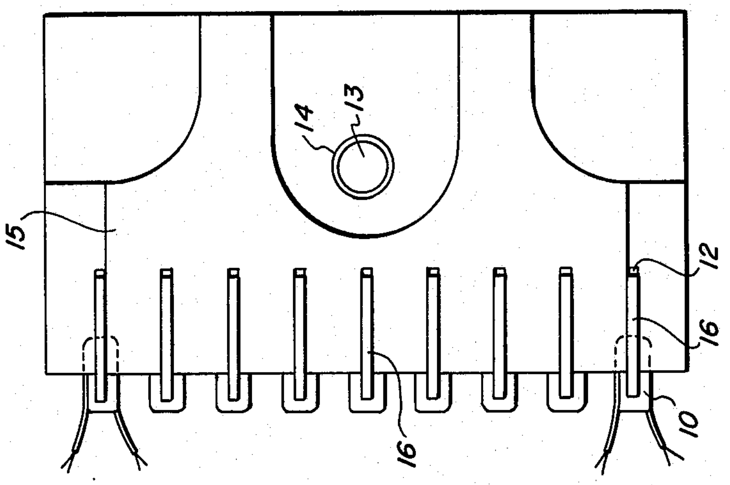
FIG. 4 is a top view of a Head Bar.
Figure 3:
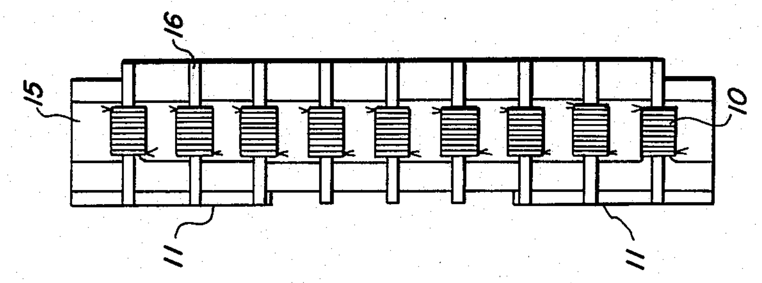
FIG. 3 is a rear view of a Head Bar on which nine Recording Heads have been mounted.
Figure 7:
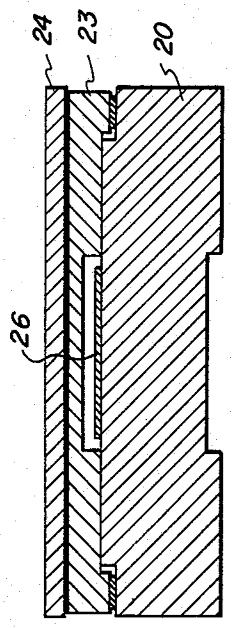
FIG. 7 is an end view of a Head Bar Assembly.
Figure 8:
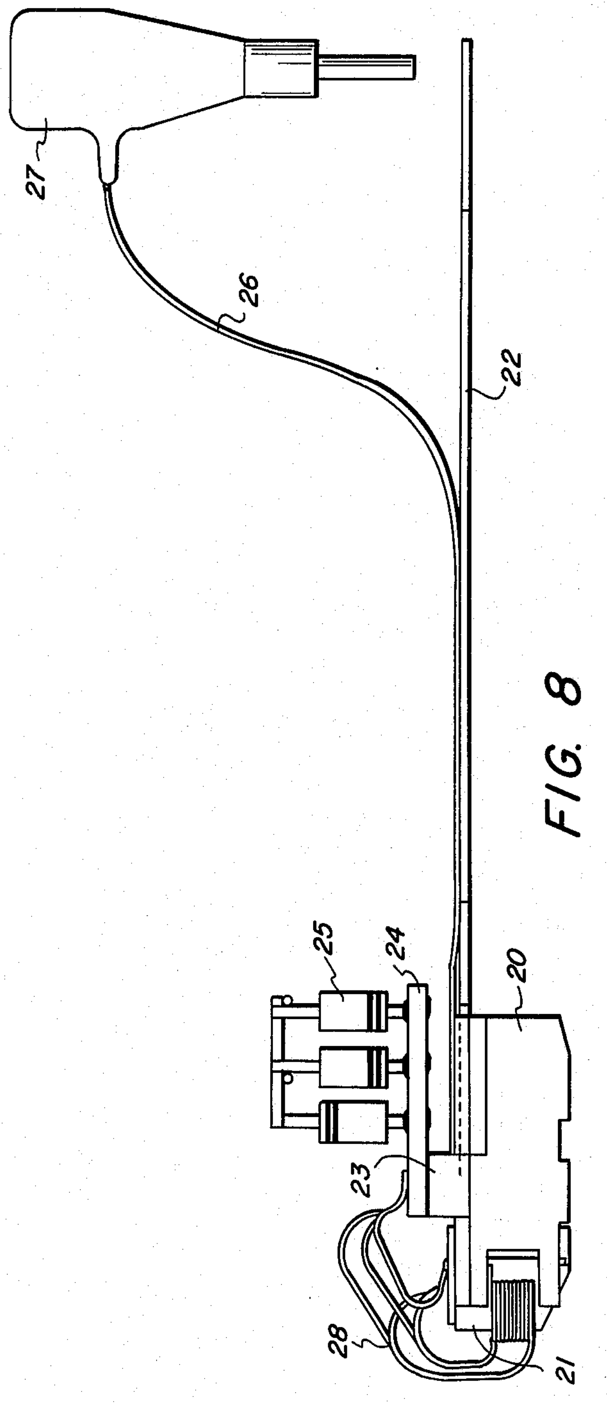
FIG. 8 is a side view of a Head Bar Assembly.
Figure 9:
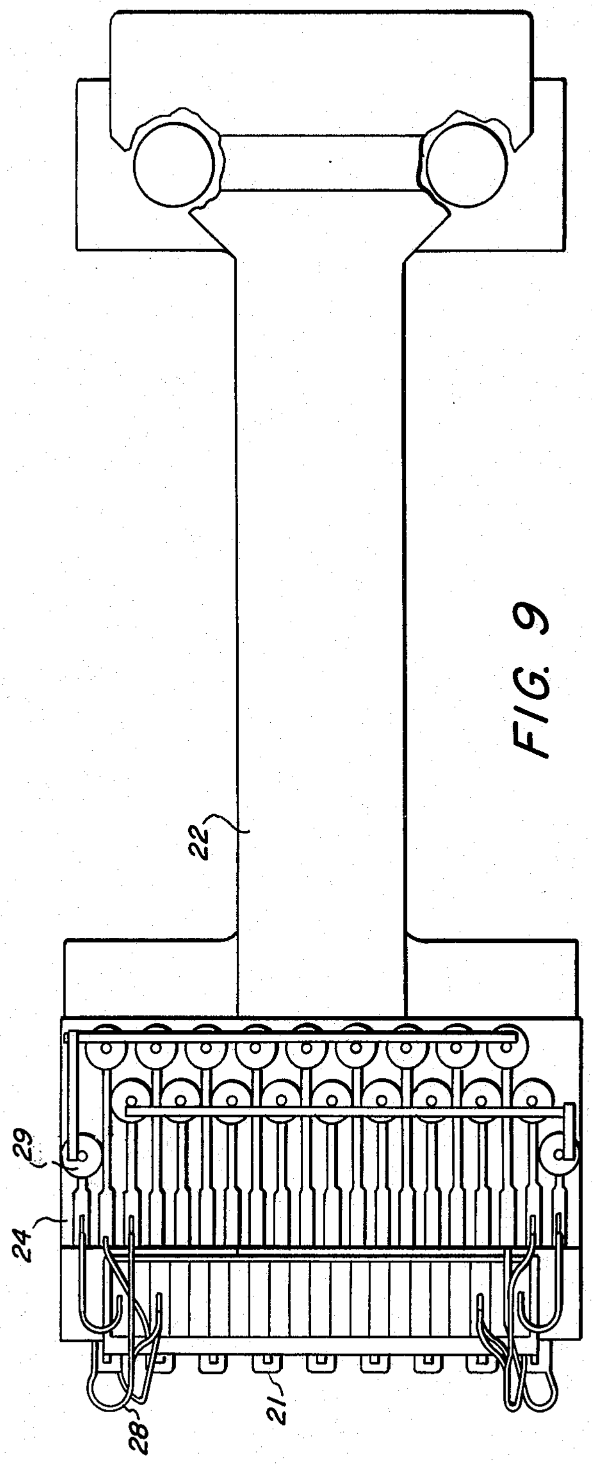
FIG. 9 is a top view of a Head Bar Assembly.

FIGS. 7, 8 and 9 show the assembly details of a Head Bar Assembly. The Head Bar 20, containing nine Recording Heads 21, is connected with Epoxy adhesive to a Head Bar Spring 22, a Spacer 23 and a Diode Board 24 on which Diodes 25 are mounted. For electrical purposes a diode is connected in series with each winding connection. Electrical connections to the Recording Heads 21 are brought in through a Cable Connector 27 and through a Flat Cable 26 to Terminals 29 on the Diode Board 24. The Wires 28 from each Recording Head 21 are also soldered to this Diode Board 24. The Sapphire Ball 13 in FIG. 4 is in contact with and is centered in a circular hole in the Head Bar Spring 22 in FIG. 8 thus assuring accurate positioning of the Head Bar Spring 22 on the Head Bar 20. The Flat Cable 26 in FIG. 7 floats freely in the space between the Head Bar 20 and the Spacer 23 of FIG. 7 and therefore does not interfere with the mechanical characteristics of the Head Bar Spring 22.

Figure 11:
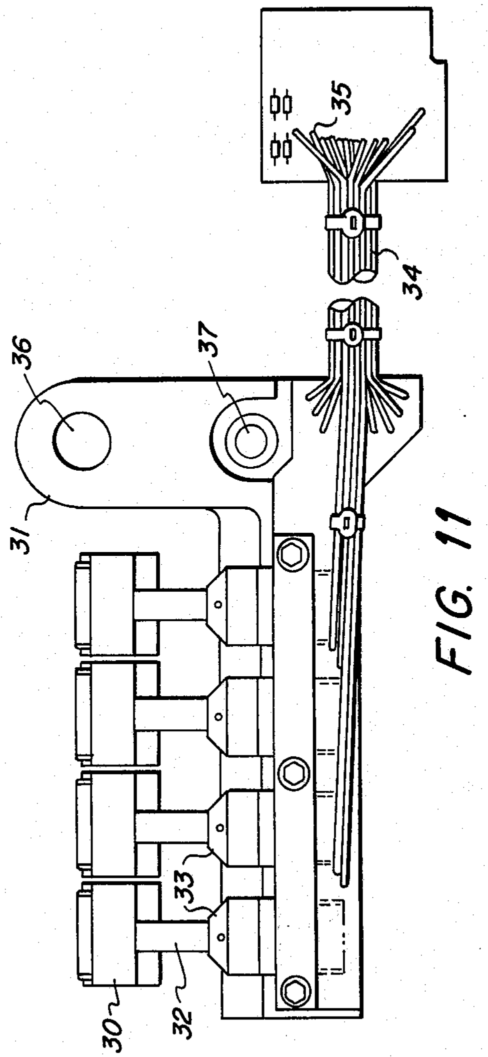
FIG. 11 is a top view of a Head Mounting Arm showing the positions of four mounted Head Bar Assemblies.
Figure 10:
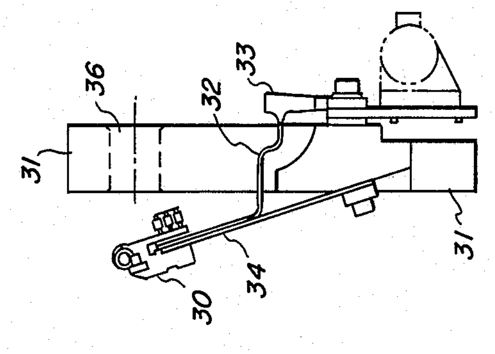
FIG. 10 is an end view of a Head Mounting Arm showing a mounted Head Bar Assembly.

FIGS. 10 and 11 are side and top views of the Head Bar Assembly on which four Head Bars 30 have been mounted. The Head Bars 30 are electrically connected through the Flat Cable 32 and through the Cable Connectors 33 to the Head Bar Assembly Wiring Harness 34 and Connector 35. The Head Bar is mechanically connected to the Head Mounting Arm 31 through the Head Bar Spring 34 which is bolted onto the bottom of the Head Mounting Arm 31. The four Head Bar Assemblies are mounted onto the Head Mounting Arm with the aid of a precision fixture to ensure that the recording heads are positioned accurately with respect to the precision mounting hole 36. One Bolt Hole 37 is provided for bolting the entire Head Bar Assembly to the Ring Arms Support.

Figure 12:
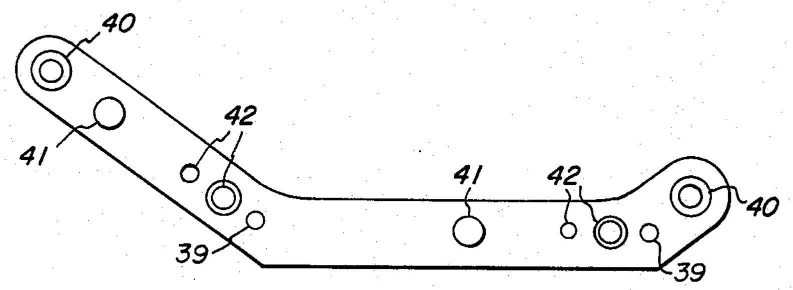
FIG. 12 is a top view of a Ring Arm Support.
Figure 13:
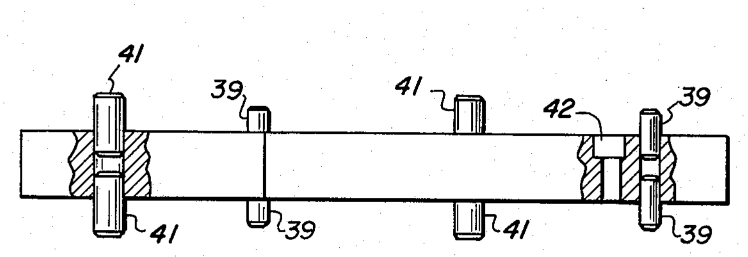
FIG. 13 is a side view of a Ring Arm Support.

FIG. 12 is a top view of the Ring Arm Support showing the location of the top two small Precision Dowel Pins 39, the top two Precision Dowel Pins 41, the two Bolt Holes 40 by which the Ring Arm Support is mounted onto the disk drive chassis and four Bolt Holes 42 which are used to connect the four Head Bar Assemblies to the Ring Arm Support. FIG. 13 is a side view of the Ring Arm Support showing the location of the four small Precision Dowel Pins 39 and four large Precision Dowel Pins 41. This arrangement allows a total of four Head Bar Assemblies to be mounted onto each Ring Arm Support, in that two Head Bar Assemblies may be mounted onto the top of the Ring Arm Support and two more may be mounted onto the bottom.

Figure 14:
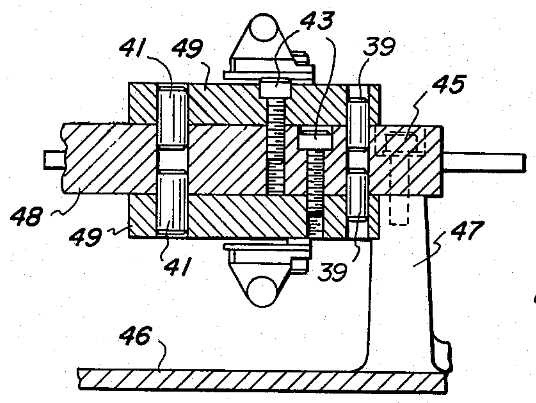
FIG. 14 is a sectional view of a Ring Arm Support showing how an upper and lower Head Mounting Arm are connected to a Ring Arm Support.

FIG. 14 is a cutaway side view which shows two Head Bar Assemblies 49 assembled onto a Ring Arm Support 48. The Head Bar Assembly is fitted onto the large Precision Dowel Pins 41 to the left of the diagram, rotated until the shoulder contacts the smaller Dowel Pin 39 to the right, and is then bolted in place with Bolt 43. Another Bolt 45 secures the Ring Arm Support to a Standoff 47 which in turn is mounted onto the disk drive Chassis 46.

Figure 15:
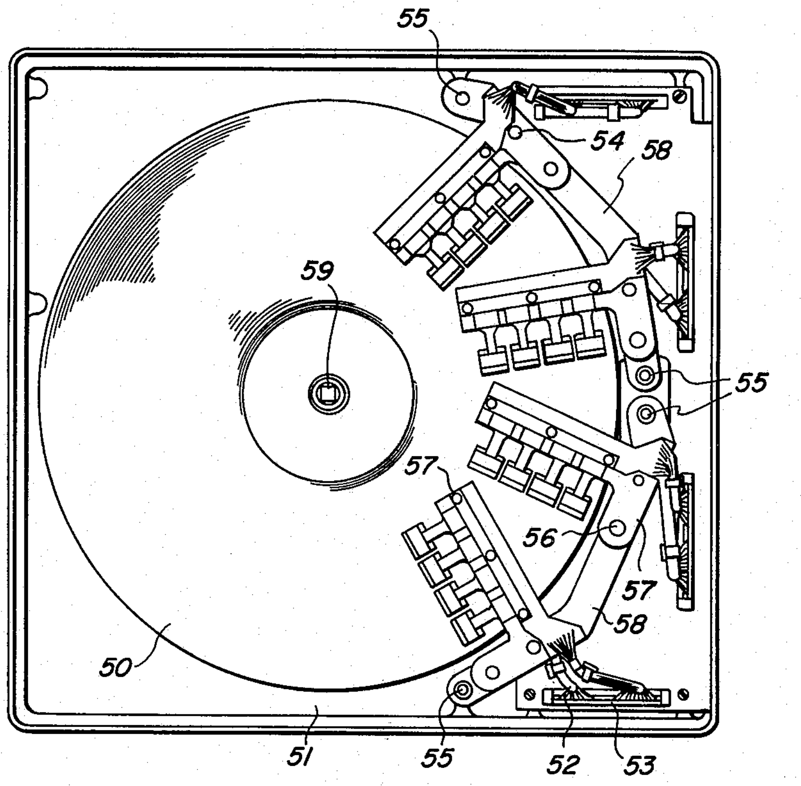
FIG. 15 is a top view of the entire disk file system showing the location of all Head Bars in relation to the disk.

FIG. 15 is a top view of the assembled disk file system. In this embodiment a single Disk 50 is mounted on a rotatable Shaft 59 which is driven by a motor mounted to the Chassis 51. Four Head Mounting Arms 57 are shown connected to two Ring Arm Assemblies 58. An additional four Head Mounting Arms, not shown, are mounted under the Disk 50. Electrical connections are made to the Chassis through Cable Harnesses 52 and Cable Connectors 53. Each Ring Arm Support is connected to the Chassis with Bolts 55 and the Head Mounting Arms are connected to the Ring Arm Supports with Bolts 54 and Precision Dowel Pins 56.

FIGS. 10 and 15, when viewed together, show that when the Head Mounting Arm is bolted into place the Head Bar 30 is in contact with the Disk Surface 50 when the disk is not rotating. Spring 34 is depressed when the Mounting Arm is bolted onto the Ring Arm Support. As shown, there is no provision made for lifting the Head Bars away from the Disk prior to stopping rotation of the Disk. When the Disk is rotating at full speed there is an air bearing between the Head Bar and the Disk. As the Disk slows down the air bearing is lost, the Head Bar will come into contact with the Disk, and in some systems this will cause Head/Disk damage. In the present system, however, the Head Bars and Disk surface are made of materials that will not be damaged when the Head Bar comes in contact with the Disk surface at low rotational speeds.

In FIG. 15 the exact placement of the Ring Arm Supports 58 in relation to the Disk Shaft 59 is simplified through the use of a specially built alignment tool, and precision spacing spools which are inserted on the large precision dowel pins. This tool is essentially a steel member with a hole drilled at one end and a micrometer mounted at the other. The hole is exactly the same diameter as the Disk Shaft 59, and when bolted onto the Shaft, the tool is free to rotate about the Disk center point. The micrometer comes in contact with the spools mounted on the large precision Dowel Pins 56. Both Ring Arm Supports are positioned through the use of the Precision spools, each one 18.75 thousandths of an inch larger in radius than the preceeding spool. When the Ring Arm Supports are in the proper position Bolts 55 are tightened to maintain that position. Each large precision dowel pin is now positioned 18.75 thousandths of an inch further away from the disk center than the preceeding pin. This adjustment ensures that when the Head Mounting Arms are installed on the Ring Arm Supports each successive set of Recording Heads will be spaced properly with respect to every other set of Recording Heads. It can now be seen that once the Ring Arm Supports are properly positioned, Head Mounting Arms may be replaced without the need for any adjustments.

It is to be understood that the above described arrangement is merely illustrative of the principles of the invention. While a particular embodiment of the present invention has been described and illustrated, it will be apparent to those skilled in the art that changes and modifications may be made therein without departure from the spirit and scope of the invention as claimed.

What is claimed is:

1. In a head-per-track disk file system, a method of interlacing a plurality of recording heads attached to and equally spaced along several head mounting arms comprising the steps of:

first positioning a first set of pins about the periphery of said disk so that the distance of each pin from the disk center differs from that of the preceeding pin by the distance between the disk tracks, second positioning a second set of pins in relation to the first set so that when a head mounting arm is mounted onto one of the first set of pins and rotated to a point where a shoulder of said head mounting arm contacts a pin of the second set, the recording heads of said head mounting arm will be on a disk radius line, mounting a head mounting arm on each of the first set of pins, rotating each head mounting arm until said shoulder of said head mounting arm contacts one of the second set of pins, and bolting said head mounting arm in place.

2. In a head-per-track disk file system, a method of interlacing a plurality of recording heads attached to and equally spaced along several head mounting arms comprising the steps of:

mounting a ring arm support loosely in the disk file plane, adjusting the position of said ring arm support in the disk plane so that one of two precision dowel pins is further from the disk center point than the other by half the distance between recording heads on a single head mounting arm, bolting said ring arm support permanently in place, mounting a head mounting arm on each precision dowel pin by fitting said pin into a matching hole drilled into said head mounting arm, rotating each head mounting arm about said precision dowel pin until a shoulder of each head mounting arm contacts an additional precision dowel pin, said additional dowel pin per head mounting arm being located so that the rotating step will position all recording heads on each head mounting arm along a disk radius line, and bolting said head mounting arm in place.

3. In a head-per-track disk file system, apparatus for interlacing heads comprising:

a disk containing *m* times *n* equally spaced concentric tracks on one surface, a support member positioned in the plane of said disk and beyond the periphery of said disk, first and second sets of *n* dowel pins mounted on said support member perpendicular to said disk surface and positioned about the periphery of said disk so that the distance of each pin from said disk center differs from the distance to the next pin of each set by the distance between consecutive tracks on said disk, a set of *n* head mounting arms, each arm containing a hole adapted to receive one of said first set of dowel pins, and a shoulder adapted to contact one of said second set of dowel pins, and a set of *m* magnetic heads mounted in line on each mounting arm, separated by a distance equal to *n* track widths and positioned so that when each of said mounting arm holes is fitted onto its corresponding dowel pin of said first set and rotated until said shoulder contacts its corresponding dowel pin of said second set, the set of *m* magnetic heads will be positioned along a disk radius and in close proximity to said disk surface.

4. The apparatus of claim 3 wherein interlaced heads are positioned over both upper and lower surfaces of said disk.

5. The apparatus of claim 3 wherein said disk file system comprises a plurality of disks, and wherein each disk surface is associated with a set of interlaced recording heads.

6. In a head-per-track disk file system, apparatus for interlacing heads comprising:

a disk containing 2*m* equally spaced concentric tracks on one surface thereof, two head mounting arms extending over said surface of said disk,

*m* heads attached to said arms, equally spaced apart a distance equal to 2 track widths and along a disk radius, said heads being attached to said arms by spring means for urging said heads against said disk surface, and an arm support member mounted in the disk plane and beyond the periphery of said disk and having four precision dowel pins protruding upward and perpendicular to said disk plane, two of said dowel pins being used as locator pins which mate with holes drilled in each head mounting arm, one locator pin being further from the disk center point by an amount equal to half the distance between heads on one head mounting arm; the other two of said dowel pins being used as rotational stops so that when each head mounting arm is mounted on said locator pin and rotated against the corresponding rotational stop, all recording heads on that head mounting arm will be positioned along one disk radius line.

7. The apparatus of claim 6 wherein interlaced heads are positioned over both upper and lower surfaces of said disk.

8. The apparatus of claim 6 wherein several disks may be used in each disk file system.

* * * * *